US011394825B1

(12) United States Patent
Gupta et al.

(10) Patent No.: US 11,394,825 B1
(45) Date of Patent: Jul. 19, 2022

(54) MANAGING MOBILE DEVICE PHONE CALLS BASED ON FACIAL RECOGNITION

(71) Applicant: MOTOROLA MOBILITY LLC, Chicago, IL (US)

(72) Inventors: Ranjeet Gupta, Naperville, IL (US); Joel D. Voss, Elkhorn, WI (US)

(73) Assignee: Motorola Mobility LLC, Chicago, IL (US)

(*) Notice: Subject to any disclaimer, the term of this patent is extended or adjusted under 35 U.S.C. 154(b) by 0 days.

(21) Appl. No.: 17/201,273

(22) Filed: Mar. 15, 2021

(51) Int. Cl.
*H04M 3/42* (2006.01)
*G06F 21/32* (2013.01)
*G06V 40/16* (2022.01)

(52) U.S. Cl.
CPC ........ *H04M 3/42229* (2013.01); *G06F 21/32* (2013.01); *G06V 40/16* (2022.01); *H04M 3/42059* (2013.01); *H04M 2203/6054* (2013.01)

(58) Field of Classification Search
CPC ...... H04M 3/42229; H04M 2203/6054; G06V 40/16
USPC .............. 379/201.01, 373.03, 88; 455/414.1, 455/412.1
See application file for complete search history.

(56) References Cited

U.S. PATENT DOCUMENTS

| | | | | |
|---|---|---|---|---|
| 8,358,759 B2* | 1/2013 | Kumar | ............. | H04M 3/42042 340/5.82 |
| 8,548,158 B2* | 10/2013 | Silver | ..................... | H04M 1/57 379/373.03 |
| 9,386,147 B2* | 7/2016 | McDysan | ............. | H04M 3/568 |
| 9,451,062 B2* | 9/2016 | Rodolico | ............. | G06V 40/172 |
| 11,102,354 B2* | 8/2021 | Bender | ................ | H04M 3/569 |
| 11,122,161 B1* | 9/2021 | Patel | ................. | H04M 3/42272 |
| 2015/0317511 A1* | 11/2015 | Li | ........................ | G06V 40/165 382/118 |
| 2020/0293754 A1* | 9/2020 | Huang | .................... | G06F 21/32 |

* cited by examiner

*Primary Examiner* — William J Deane, Jr.
(74) *Attorney, Agent, or Firm* — Isidore PLLC

(57) ABSTRACT

A method, a communication device and a computer program product for managing communication device calls based on facial recognition. The method includes detecting, via a processor of a communication device, an incoming call and triggering an image capture device to capture image data from a field of view of the image capture device. The method further includes receiving the image data from the image capture device and retrieving reference image data from a memory. The method further includes determining if the image data is substantially similar to the reference image data and in response to the image data being substantially similar to the reference image data, stopping at least one notification associated with the incoming call.

20 Claims, 7 Drawing Sheets

MANAGING MOBILE DEVICE PHONE CALLS BASED ON FACIAL RECOGNITION

BACKGROUND

1. Technical Field

The present disclosure generally relates to mobile devices and in particular to managing mobile device calls based on facial recognition.

2. Description of the Related Art

Mobile communication devices, such as cell phones, are widely used for voice communication and data transmission. Mobile devices receive incoming phone calls and alert the user to the incoming call using a variety of on-screen messages, sounds, such as ring tones, and/or by vibrations. Often, the user of a mobile device can be in a situation where they are unable to answer the incoming phone call or do not wish to answer the incoming phone call. For example, the user may be driving a vehicle or in a meeting. As another example, the user may view the incoming call as not having sufficient priority for the call to be answered immediately.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
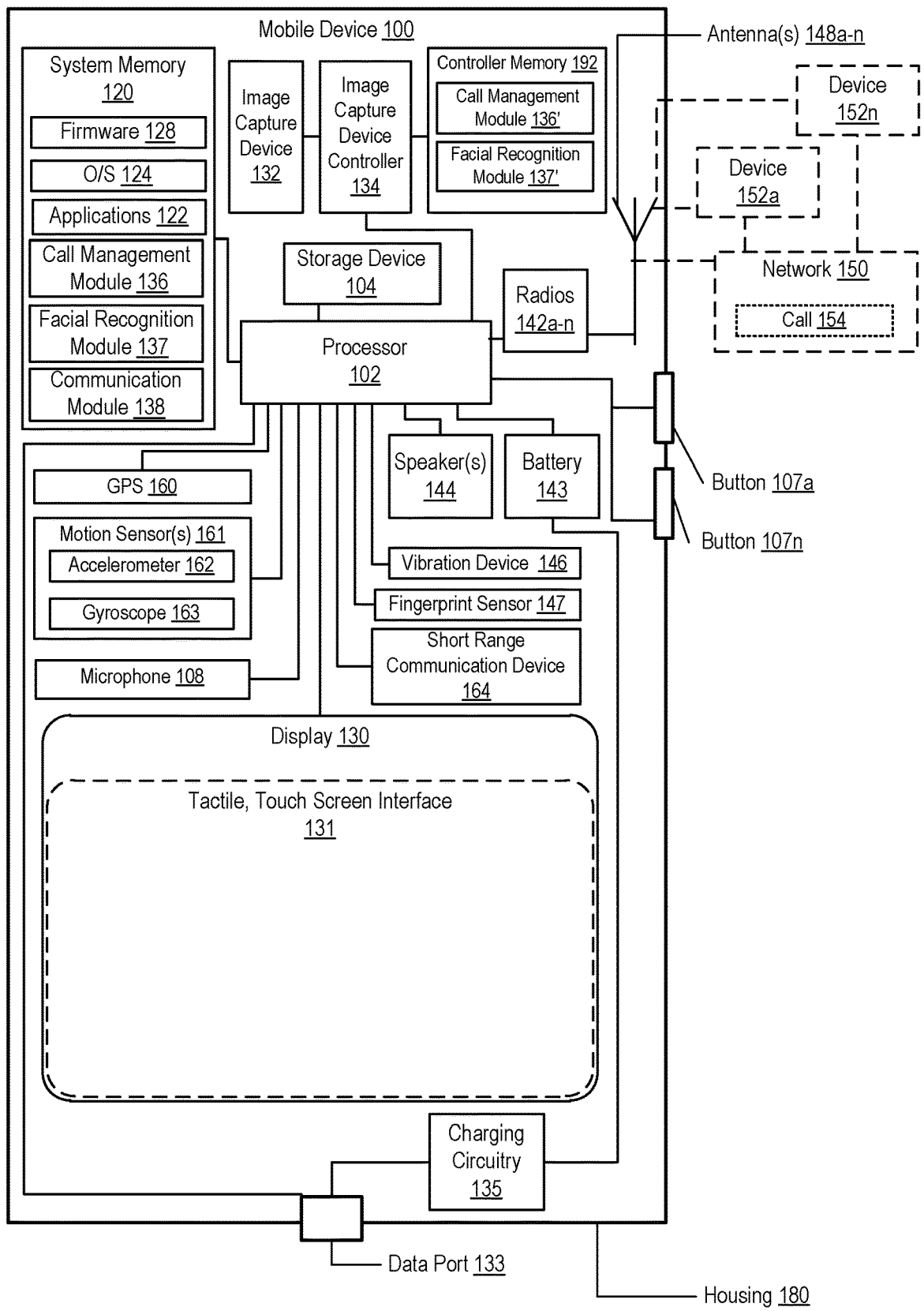
FIG. 1 depicts an example mobile device within which various aspects of the disclosure can be implemented, according to one or more embodiments.

According to one aspect of the disclosure, the illustrative embodiments provide a method, a communication device and a computer program product for managing communication device calls based on facial recognition. In a first embodiment, the method includes detecting, via a processor of a communication device, an incoming call, and triggering an image capture device of the communication device to capture first image data from a field of view of the image capture device. The method further includes receiving the first image data from the image capture device and retrieving reference image data from a memory. The method further includes determining if the first image data is substantially similar to the reference image data, and in response to the first image data being substantially similar to the reference image data, stopping at least one notification associated with the incoming call. After a registered user has viewed the communication device, the notification can be stopped automatically by the communication device so that the user does not have to manually stop the notification or continue to be interrupted by the notification.

According to another embodiment, a communication device includes an image capture device and a memory having stored thereon a facial recognition module and a call management module for managing calls on the communication device. One or more processors are communicatively coupled to the image capture device and the memory. The one or more processors execute program code of the facial recognition module and the call management module, which enables the communication device to detect an incoming call and trigger the image capture device to capture first image data from a field of view of the image capture device. The program code further enables the communication device to receive the first image data from the image capture device and retrieve reference image data from the memory. The program code further enables the communication device to determine if the first image data is substantially similar to the reference image data, and in response to the first image data being substantially similar to the reference image data, stop at least one notification associated with the incoming call. After a registered user has viewed the communication device, the notification can be stopped automatically by the communication device so that the user does not have to manually stop the notification or continue to be interrupted by the notification.

According to an additional embodiment, a computer program product includes a computer readable storage device with program code stored thereon which, when executed by one or more processors of a communication device having an image capture device and a memory, enables the communication device to complete the functionality of detecting an incoming call and triggering the image capture device to capture first image data from a field of view of the image capture device. The computer program product further enables the communication device to complete the functionality of receiving the first image data from the image capture device and retrieving reference image data from the memory. The computer program product further enables the communication device to complete the functionality of determining if the first image data is substantially similar to the reference image data and in response to the first image data being substantially similar to the reference image data, stopping at least one notification associated with the incoming call. After a registered user has viewed the communication device, the notification can be stopped automatically by the communication device so that the user does not have to manually stop the notification or continue to be interrupted by the notification.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within mobile communication device 100 (FIG. 1) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1 depicts an example communication device 100 within which various aspects of the disclosure can be implemented, according to one or more embodiments. Examples of such communication devices include, but are not limited to, a notebook computer, a mobile phone, a digital camera, a smart watch and a tablet computer, etc. For purposes of the described embodiments, communication device 100 shall be described as mobile device 100. Mobile device 100 includes processor 102, which is communicatively coupled to storage device 104, system memory 120, display 130, and image capture device (ICD) controller 134. Processor 102 can include processor resources such as a central processing unit (CPU) that support computing, classifying, processing and transmitting of data and information.

System memory 120 may be a combination of volatile and non-volatile memory, such as random access memory (RAM) and read-only memory (ROM). System memory 120 can store program code or similar data associated with firmware 128, an operating system 124, applications 122, call management module 136, facial recognition module 137, and communication module 138. Call management module 136 includes program code that is executed by processor 102 to enable mobile device 100 to manage incoming calls to mobile device 100. Facial recognition module 137 includes program code that is executed by processor 102 to enable mobile device 100 to detect a facial shape and perform authentication or recognition of the face of a user of mobile device 100. Communication module 138 includes program code that is executed by processor 102 to enable mobile device 100 to communicate with other external devices and system.

Although depicted as being separate from applications 122, phone call management module 136, facial recognition module 137, and communication module 138 may also be each implemented as an application. Processor 102 loads and executes program code stored in system memory 120. Examples of program code that may be loaded and executed by processor 102 include program code associated with applications 122 and program code associated with phone call management module 136, facial recognition module 137, and communication module 138.

Display 130 can be one of a wide variety of display screens or devices, such as a liquid crystal display (LCD) and an organic light emitting diode (OLED) display. In some embodiments, display 130 can be a touch screen device that can receive user tactile/touch input. As a touch screen device, display 130 includes a tactile, touch screen interface 131 that allows a user to provide input to or control mobile device 100 by touching features presented within/below the display screen.

In one embodiment, a secondary controller can be used to manage incoming calls to mobile device 100. ICD controller 134 is an example of a secondary controller that can be programmed to provide the functional features described herein. Image capture device 132 is communicatively coupled to ICD controller 134, which is communicatively coupled to processor 102. ICD controller 134 supports the processing of signals from image capture device 132 and the connection of signals from image capture device 132 to processor 102. Image capture device 132 can capture images that are within the field of view of image capture device 132. In an embodiment, image capture device 132 can capture image data in facial images of users and non-users who are in proximity to mobile device 100.

ICD controller 134 is communicatively coupled to controller memory 192. Controller memory 192 may be a combination of volatile and non-volatile memory, such as random access memory (RAM) and read-only memory (ROM). Controller memory 192 can store program code or similar data such as call management module 136' and facial recognition module 137'. In one embodiment, when call management module 136' and facial recognition module 137' are included in controller memory 192, call management module 136 and facial recognition module 137 can be omitted from system memory 120. Call management module 136' includes program code that is executed by ICD controller 134 to enable the management of incoming calls to mobile device 100. Facial recognition module 137' includes program code that is executed by ICD controller 134 to enable the detection of a facial shape and authentication or recognition of the face of a user of mobile device 100.

ICD controller 134 loads and executes program code stored in controller memory 192. Examples of program code that may be loaded and executed by ICD controller 134 include program code associated with phone call management module 136' and facial recognition module 137'. Although depicted as being separate modules in controller memory 192, call management module 136' and facial recognition module 137' may also be combined into one module.

As a smaller, less complex, integrated circuit (IC), ICD controller 134 consumes less power that processor 102. Thus, the embodiments in which ICD controller 134 is utilized to execute program code associated with call management module 136' and facial recognition module 137' in order to manage incoming calls to mobile device 100 is more power efficient than embodiments utilizing processor 102 to execute call management module 136 and facial recognition module 137. For example, when processor 102 is in a sleep state, using ICD controller 134 to execute call management module 136' and facial recognition module 137' consumes less power than waking up processor 102 from the sleep state to execute program code.

Mobile device 100 can further include data port 133, charging circuitry 135, and battery 143. Mobile device 100 further includes a microphone 108, one or more speakers 144 and one or more input buttons 107*a-n*. Input buttons 107*a-n* may provide controls for volume, power, and image capture device 132.

Mobile device 100 further includes radios 142*a-n*, which are coupled to antennas 148*a-n*. In this implementation, radios 142*a-n* and antennas 148*a-n* allow mobile device 100 to communicate wirelessly with other devices 152*a-n* via wireless network 150. In one embodiment, mobile device 100 can detect and receive at least one call 154 from wireless network 150 and can transmit at least one call to wireless network 150. Call 154 can be a variety of different types of calls including a voice call, a wireless (Wi-Fi) based voice call, a video call and an emergency alert. An amber alert and a test of the national emergency broadcast system are examples of emergency alerts.

Mobile device 100 further includes vibration device 146, fingerprint sensor 147, global positioning system (GPS) device 160, and motion sensor 161. Vibration device 146 can cause mobile device 100 to vibrate or shake when activated. Vibration device 146 can be activated during an incoming call or message in order to provide an alert or notification to a user of mobile device 100.

Fingerprint sensor 147 can scan the finger of a user and generate biometric data or fingerprint data corresponding to the user's fingerprint. A user places his/her finger over the fingerprint sensor in order to initiate scanning of the fingerprint. Fingerprint sensor 147 can be used to provide biometric data to identify or authenticate a user. GPS device 160 can provide time data and location data about the physical location of mobile device 100 using geospatial input received from GPS satellites.

Motion sensor(s) 161 can include one or more accelerometers 162 and gyroscope 163. Motion sensor(s) 161 can detect movement of mobile device 100 and provide motion data to processor 102 indicating the spatial orientation and movement of mobile device 100. Accelerometers 162 measure linear acceleration of movement of mobile device 100 in multiple axes (X, Y and Z). For example, accelerometers 162 can include three accelerometers, where one accelerometer measures linear acceleration in the X axis, one accelerometer measures linear acceleration in the Y axis, and one accelerometer measures linear acceleration in the Z axis. Gyroscope 163 measures rotation or angular rotational velocity of mobile device 100. Mobile device 100 further includes a housing 180 that contains/protects the components of the mobile device.

Mobile device 100 further includes short range communication device 164. Short range communication device 164 is a low powered transceiver that can wirelessly communicates with other devices. Short range communication device 164 can include one or more of a variety of devices, such as a near field communication (NFC) device, a Bluetooth device, and/or a wireless fidelity (Wi-Fi) device. In one embodiment, mobile device 100 can receive internet or Wi-Fi based calls via short range communication device 164.

In the description of each of the following figures, reference is also made to specific components illustrated within the preceding figure(s).

Figure 2:
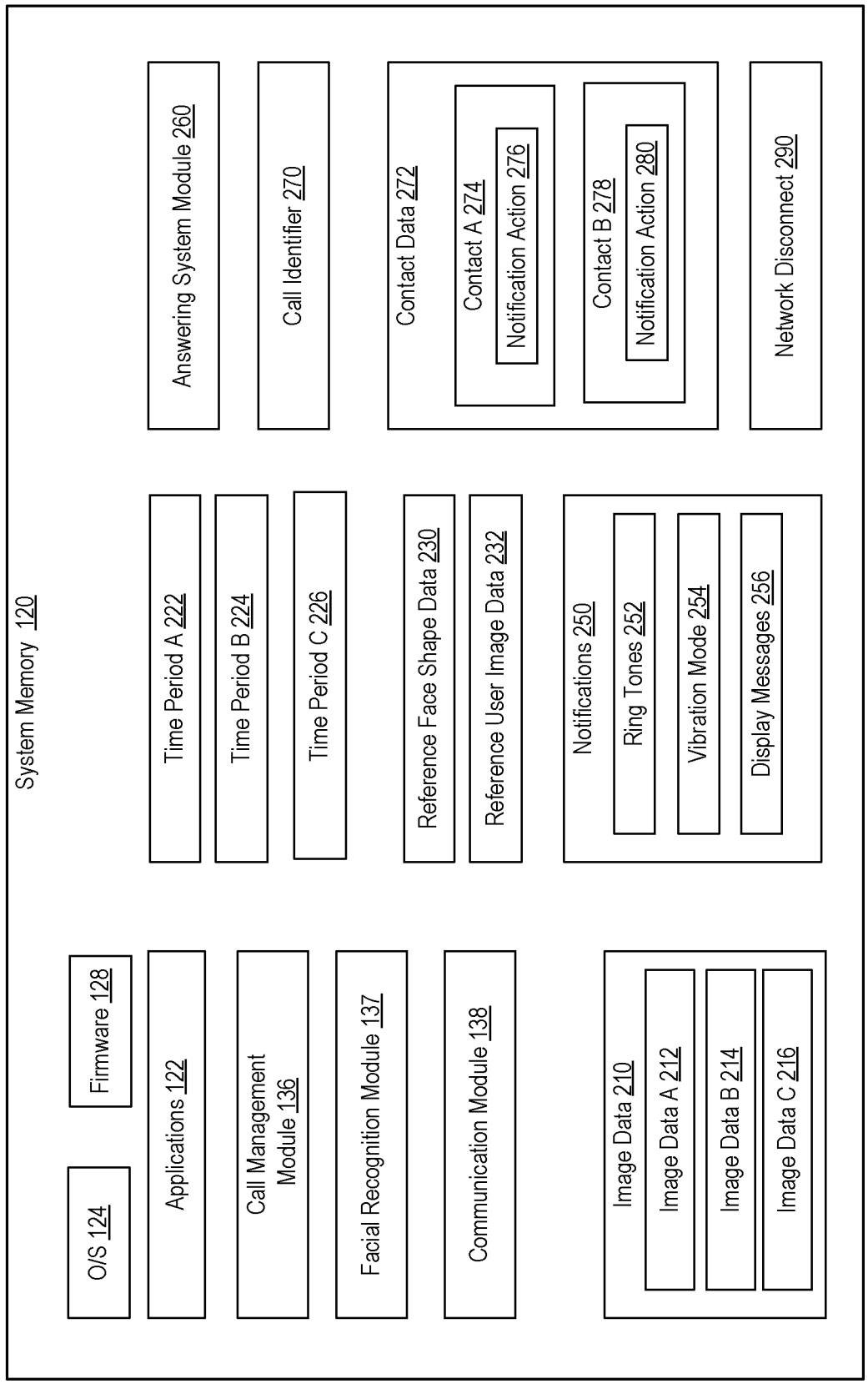
FIG. 2 is a block diagram of example contents of the system memory of a mobile device, according to one or more embodiments.

Referring to FIG. 2, one embodiment of example contents of system memory 120 of mobile device 100 is shown. System memory 120 includes data, software, and/or firmware modules, including applications 122, operating system 124, firmware 128, call management module 136, facial recognition module 137 and communication module 138.

Call management module 136 enables the management of incoming calls to mobile device 100. Facial recognition module 137 enables the detection of a facial shape and the authentication or recognition of the face of a registered user of mobile device 100. Communication module 138 enables mobile device 100 to communicate with network 150. Although depicted as being separate modules in system memory 120, the features and/or functions associated with call management module 136 and facial recognition module 137 may also be combined into one module.

In one embodiment, call management module 136 and facial recognition module 137 enables the management of incoming calls to mobile device 100. In one embodiment, execution of call management module 136 and facial recognition module 137 by processor 102 enables/configures mobile device 100 to perform the processes presented in the flowchart of FIGS. 5A-B, as will be described below.

System memory 120 further includes image data 210, time period A 222, time period B 224, time period C 226, reference face shape 230, and reference user image 232. Image data 210 can include facial images captured by image capture device 132 (FIG. 1). Image data 210 includes image data A 212, image data B 214 and image data C 216. Image data A 212 can be captured by image capture device 132 during time period A 222. Image data B 214 can be captured by image capture device 132 during time period B 224. Image data C 216 can be captured by image capture device 132 during time period C 226.

Reference face shape 230 is a stored generic facial shape. For example, reference face shape 230 can include an oval head outline, two eyes and a nose. Reference user image 232 is a stored authenticated facial image of a registered user associated with mobile device 100. A registered user is an individual associated with the mobile device who has previously registered or enrolled with the mobile device.

System memory 120 further includes notifications 250 and answering system module 260. Mobile device 100 provides notifications 250 to alert a user when an incoming call is detected. Notifications 250 can include one or more ring tones 252, vibration mode setting 254 and display messages 256. When an incoming call is detected, mobile device 100 can alert a user to the incoming call by performing one or more of generating an audio ring tone 252 via speaker 144, triggering vibration device 146 to cause the mobile device to vibrate according to vibration mode setting 254, and showing display messages 256 on display 130. Answering system module 260 enables the playing of a greeting and the recording of a message from a caller when a call has not been answered.

System memory 120 further includes call identifier 270 and contact data 272. Call identifier 270 is an identifier received from network 150 with the incoming call. For example, call identifier 270 can be a phone number. Contact data 272 is a directory or database that contains stored contact information such as names, addresses, phone numbers and e-mail addresses. Contact data 272 can include contact data A 274 and contact data B 278. While two contacts are shown, contact data 272 can contain a larger number of contacts, up to hundreds or thousands of contacts. Contact data A 274 includes notification action 276 and contact data B 278 includes notification action 280. Notification actions 276 and 280 are actions performed by mobile device 100 when call identifier 270 matches a contact within contact data 272. For example, one notification action can be to provide a first ring tone for a first contact and a second ring tone for a second contact. Another notification action can be to provide a vibration alert for a first contact and none for a second contact. According to one or more aspects, the first ring tone may be used for incoming calls from family members, and the second ring tone may be used to alert the user/subscriber to calls from work contacts. As a result, the various notification actions can be used to alert the user to calls based on a contact's relationship with the user and/or the contact's call priority to the user.

System memory 120 further includes network disconnect 290. Network 150 can transmit network disconnect 290 to mobile device 100 after a pre-determined period of time if no user action occurs such as a user selecting to accept the call or to reject the call via touch screen interface 131. Network 150 disconnects call 154 after a pre-determined period if no user action occurs.

Figure 3:
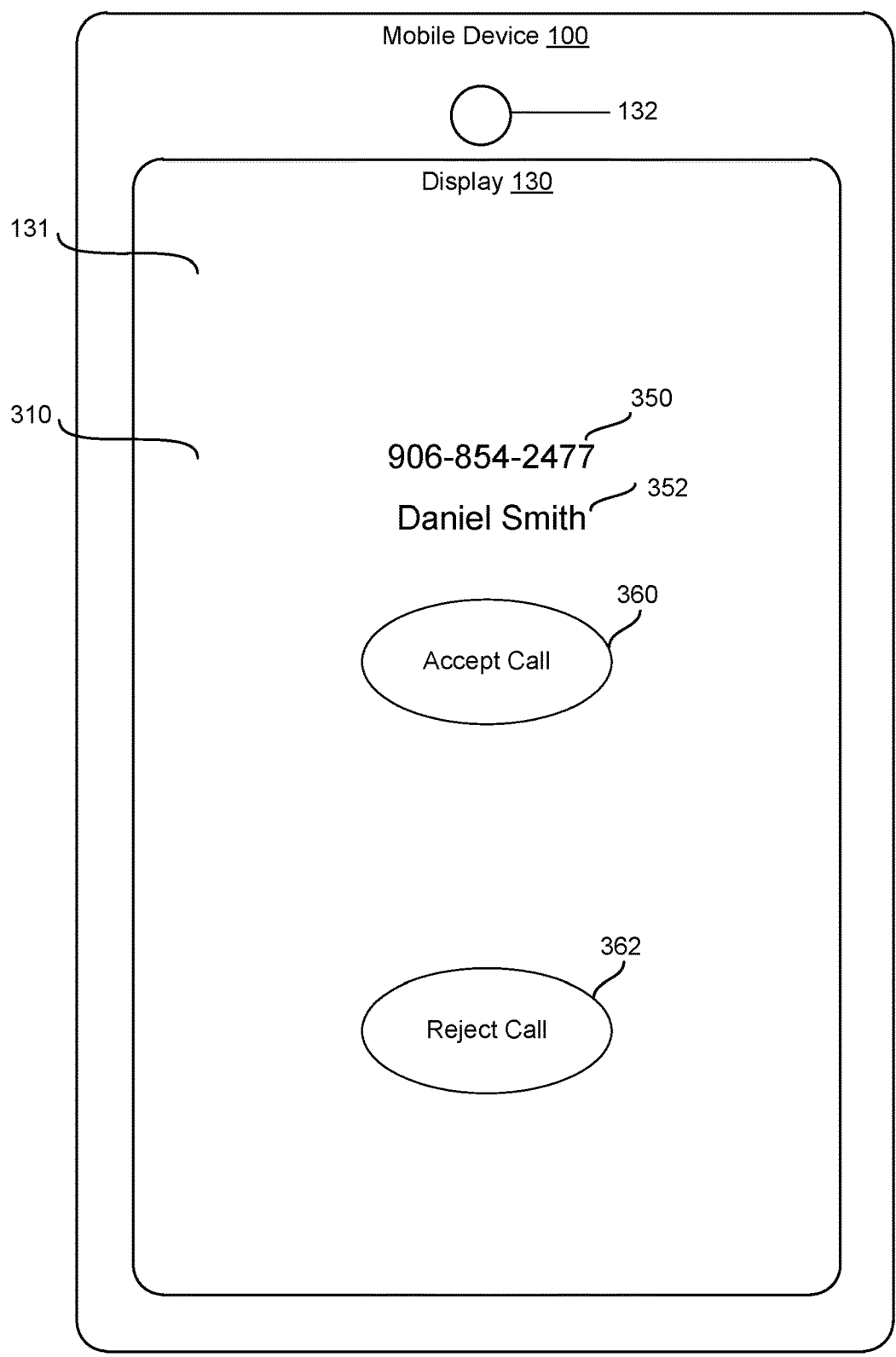
FIG. 3 is an example illustration of a graphical user interface (GUI) presented on a display of a mobile device during the detection of an incoming call, according to one or more embodiments.

FIG. 3 illustrates an example graphical user interface (GUI) 310 presented on display 130 of mobile device 100 during the detection of an incoming call. GUI 310 includes caller number 350, caller identifier 352, accept call icon 360 and reject call icon 362. When mobile device 100 detects an incoming call, mobile device 100 can generate a display message 256 (FIG. 2) and show the display message on display 130. When mobile device 100 detects an incoming call, mobile device 100 can further generate an audio ring tone 252 via speaker 144 and cause the mobile device to vibrate according to vibration mode setting 254 via vibration device 146 in order to alert a user to the incoming call.

When selected by a user, e.g., via touch screen interface 131, accept phone icon 360 triggers the connection of mobile device 100 to the incoming call. When selected by a user, e.g., via touch screen interface 131, reject call icon 362 triggers the end of mobile device 100 providing notifications 250 about the incoming phone call. In one embodiment, the selection of reject call icon 362 can trigger the end of at least one of an output of ring tone 252, vibration mode setting 254, and the display of display message 256. In one embodiment, when reject call icon 362 is selected, a reject or disconnect notice can be transmitted to network 150 to disconnect the call, and answering system 260 can be triggered to answer the incoming call.

Figure 4B:
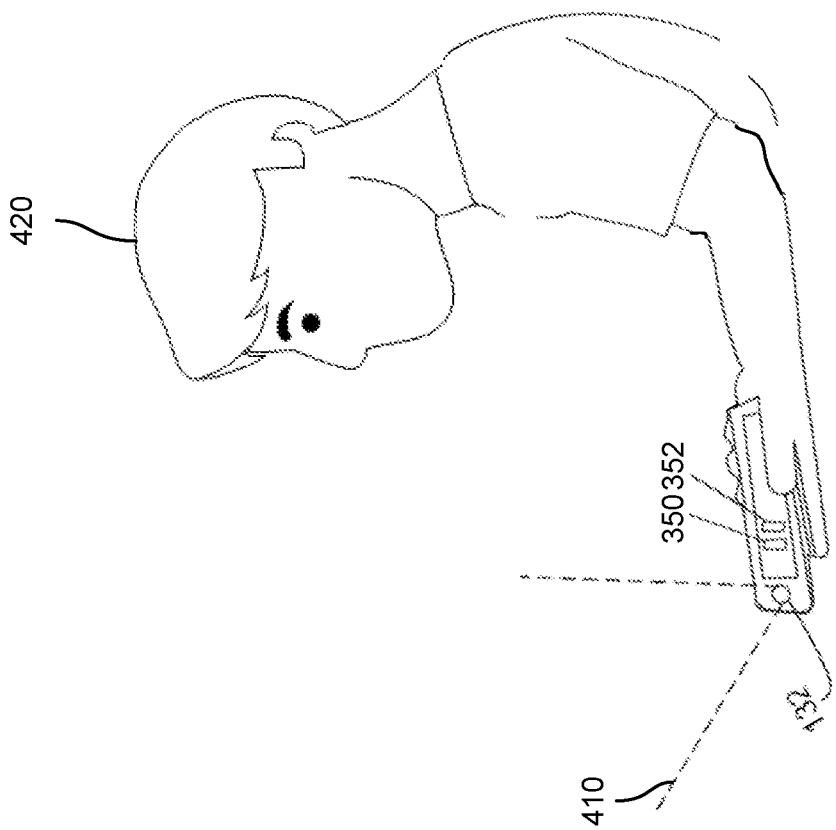
FIG. 4B is an example illustration of a registered user holding the mobile device of FIG. 4A such that the user's face is not detectable within the field of view of the image capture device of the mobile device, according to one or more embodiments.
Figure 4A:
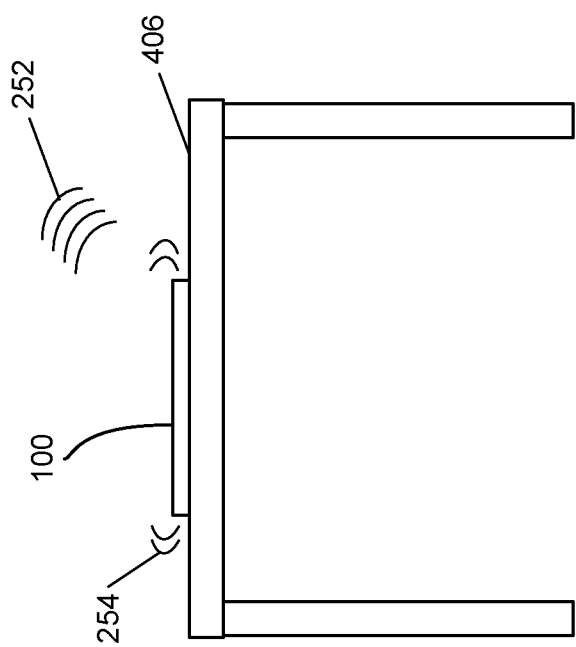
FIG. 4A is an example illustration of a mobile device detecting an incoming call while located face-up on a table, according to one or more embodiments.

FIG. 4A illustrates a mobile device 100 lying on a table 406 while detecting an incoming call. In one embodiment, when mobile device 100 receives an incoming call from network 150, mobile device 100 can provide an alert or notifications 250 to a user such an audible ring tone 252 or vibrations via vibration mode setting 254. In one embodiment, mobile device 100 can continue to provide notifications 250 until a network disconnect 290 is received from network 150 or a user input action to accept or reject the call is detected via touch screen interface 131.

FIG. 4B illustrates an example of a user 420 not in a field of view 410 of image capture device 132 during an incoming call. Although the user is holding the device, the user 420 is not looking at or viewing display 130 and is not in a field of view 410 of the image capture device, while mobile device 100 notifies the user of an incoming call via ring tone 252 or vibrates according to vibration mode setting 254 (FIG. 4A). In the presented example, the user 420 may be looking away from mobile device 100 or holding the mobile device 100 in a position where the device display is not visible to the user. In one embodiment, mobile device 100 can continue to capture image data 210 and determine if a facial shape is detected until the call is disconnected by network 150 or by a user input action received via touchscreen interface 131 or other input mechanism (e.g., side on/off or control button 107a-n) of mobile device 100. For example, mobile device 100 can provide an audio alert, such as ring tone 252, during an incoming call. The user can then select accept call icon 360 via touch screen interface 131 to be connected to the incoming call. Alternatively, the user can select reject call icon 362 via touch screen interface 131 to disconnect the incoming call.

Figure 4D:
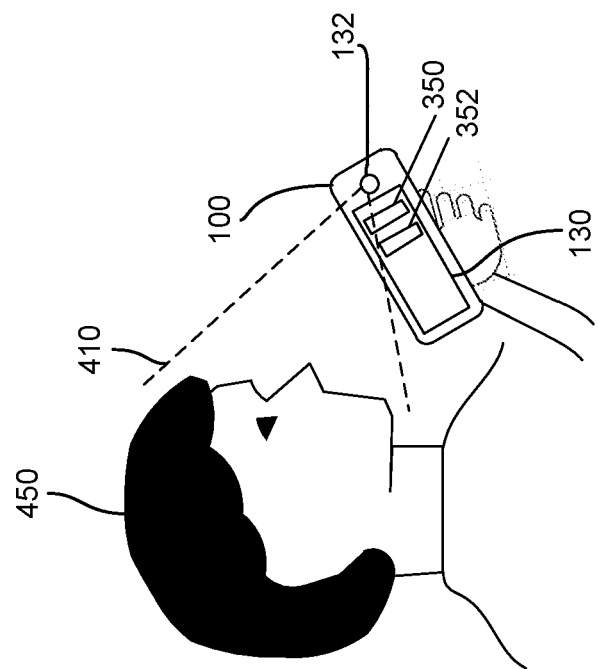
FIG. 4D is an example illustration of a non-registered user visible in a field of view of an image capture device of the mobile device of FIG. 4A during an incoming call, according to one or more embodiments.
Figure 4C:
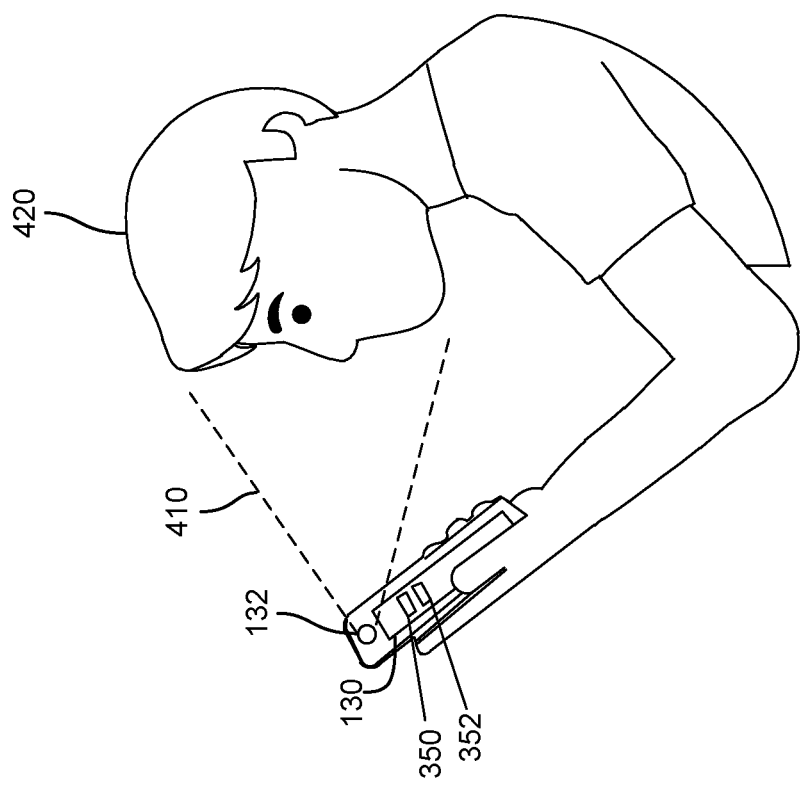
FIG. 4C is an example illustration of a registered user holding the mobile device of FIG. 4A such that the user's face is detectable within the field of view of the image capture device of the mobile device, according to one or more embodiments.

FIG. 4C illustrates an example of a user 420 in a field of view 410 of image capture device 132 during an incoming call. The user 420 can look at or view display 130. The user 420 can view caller number 350 and caller identifier 352 on display 130. Mobile device 100 can trigger image capture device 132 to capture an image (i.e., image data 210) within field of view 410 and authenticate that the image corresponds to a facial shape and to the facial image of a registered user of mobile device 100 (i.e., corresponds to reference user image data 232). After authenticating that the facial image corresponds to a registered user (i.e., now registered user 420), the notifications 250 associated with the incoming phone call can be automatically discontinued or stopped. Stopping notifications 250 can include ending of at least one of ring tone 252, vibration mode 254, and displaying of message 256. By stopping the notifications automatically, after they have viewed the mobile device, the user does not have to manually stop the notifications via touch screen interface 131 or buttons 107a-n.

FIG. 4D illustrates an example of a non-registered user 450 in a field of view 410 of image capture device 132 during an incoming call. After mobile device 100 has provided notification of an incoming call via ring tone 252 or vibration mode 254 (FIG. 4A), a non-registered user 450 can look at or view display 130. Mobile device 100 can then trigger image capture device 132 to capture a facial image and identify that the facial image does not correspond to a registered user of mobile device 100.

In one embodiment, when the captured facial image does not correspond to the facial image of a registered user, mobile device 100 can determine if a call identifier 270 matches a contact 274 within a database of contact data 272. If call identifier 270 matches contact 274 within database of contact data 272, mobile device 100 can identify a notification action 276, associated with the incoming call and initiate the notification action. For example, one notification action can be one ring tone for a first contact and a second ring tone for a second contact. In other words, when a non-registered user is viewing mobile device 100 and the caller is within database of contact data 272, mobile device 100 can provide a customized ring tone that identifies the caller via a pre-determined audio sound.

In another embodiment, when the captured facial image does not correspond to the facial image of a registered user, mobile device 100 can determine if a call identifier 270 matches a contact 274 within a database of contact data 272. When call identifier 270 does not match contact 274 within database of contact data 272, mobile device 100 can stop notifications for the incoming call and trigger answering system module 260 to answer the incoming call. In other words, when a non-registered user is viewing mobile device 100 and the caller is not within database of contact data 272, mobile device 100 automatically routes the call to an answering system and stops notifications such as a ring tone. This prevents non-registered users from answering incoming calls from unknown callers such as spam calls or automated callers. Incoming calls from unknown callers are typically associated with unwanted calls such as spam calls or automated callers. By identifying that the call identifier of the incoming call is not in the database of contact data, mobile device 100 can automatically discontinue notifications for incoming calls that typically are unwanted by the user.

In one embodiment, processor 102 (FIG. 1) detects an incoming call 154 and triggers image capture device 132 to capture a preview image A of the field of view and transmit image data A 212 (i.e., first image data) to processor 102. Processor 102 receives first image data A 212 from image capture device 132 and retrieves reference user image data 232 from system memory 120. More than one reference image may be presented by reference image data 232. Processor 102 determines if the image data A 212 is substantially similar to (any one of) reference user image data 232. In response to the image data A 212 being substantially similar to (at least one of) reference user image data 232, processor 102 stops at least one notification 250 associated with the incoming call. After a registered user has viewed the communication device, the notification can be stopped automatically by the communication device so that the user does not have to manually stop the notification or continue to be interrupted by the audible or tactile (vibrations) notification. The mobile device determines that the registered user has decided not to answer the incoming call once the mobile device detects the face of the registered user viewing the call screen or display, but the registered user does not answer the call within a predetermined period of time (e.g., 1 ring, or 2 seconds) after the registered user is detected looking at the call screen or display.

According to one aspect of the disclosure, mobile device 100 can automatically discontinue notifications 250 associated with incoming call 154 after a registered user 420 has been identified in a field of view 410 (i.e., after image capture device 132 has captured a facial image corresponding to a registered user).

According to another aspect of the disclosure, mobile device 100 can continue to capture image data 210 and determine if a facial shape is detected until the call is disconnected by network 150 or a user input action is received. User input actions can include touch input via touchscreen interface 131, turning mobile device 100 off using at least one of buttons 107a-n and spoken input via microphone 108 and voice recognition program code.

According to another aspect of the disclosure, when mobile device 100 determines that the captured facial image does not correspond to the facial image of a registered user, mobile device 100 then determines if call identifier 270 matches a contact 274 within a database of contact data 272. If call identifier 270 matches contact 274, mobile device 100 can identify a notification action 276 associated with handing incoming calls received from the matching contact 274 and initiate the notification action.

According to another aspect of the disclosure, in an alternate embodiment, when mobile device 100 determines that the captured facial image does not correspond to the facial image of a registered user, mobile device 100 then determines if call identifier 270 matches contact 274. If call identifier 270 does not match contact 274, mobile device 100 presents a different notification for the incoming call and triggers answering system module 260 to answer the incoming call. The different notification can notify the user that the incoming call is a spam call or an unknown caller and the call is routed to voicemail.

Figure 5A:
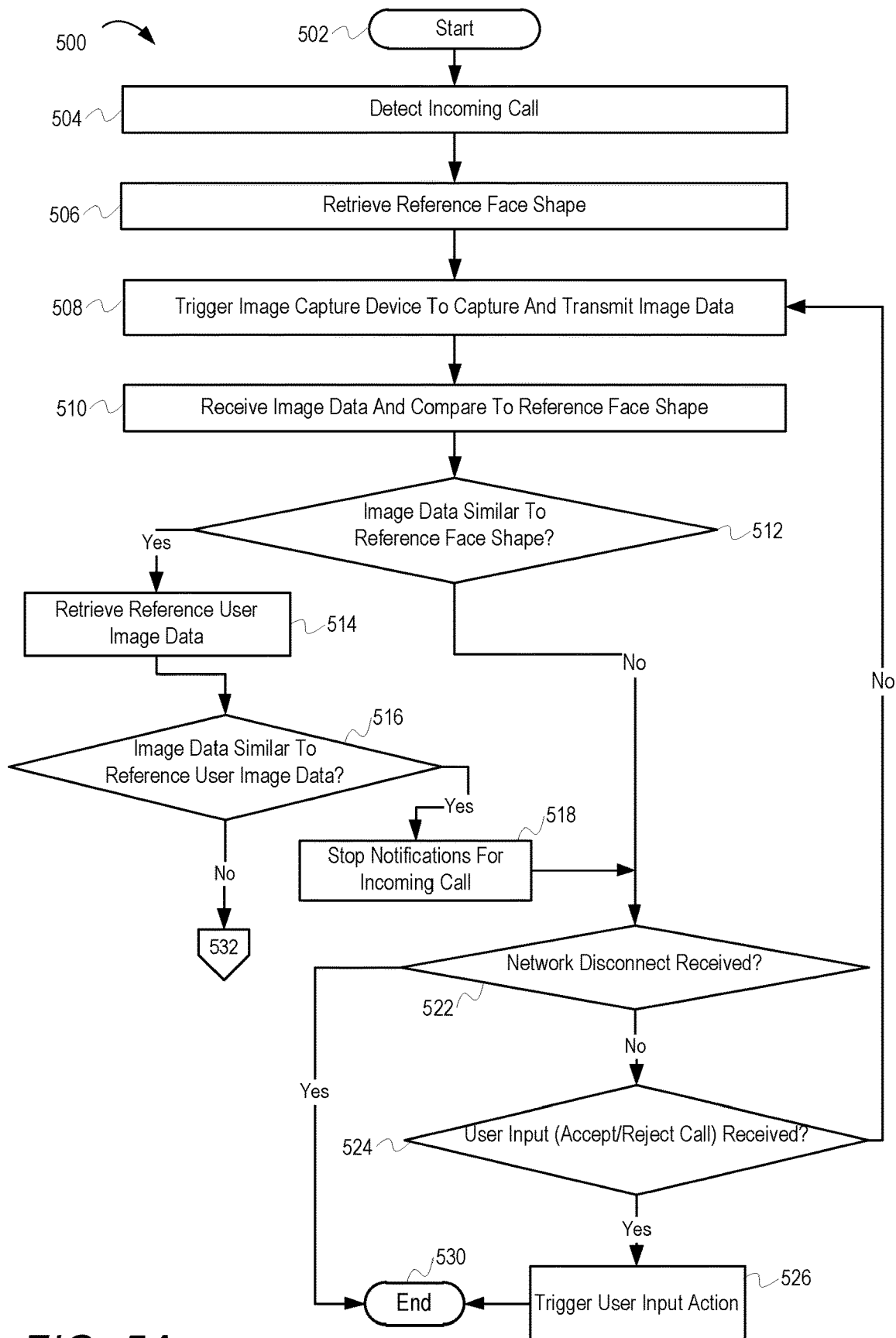
FIGS. 5A and 5B depict a flowchart of a method of managing calls received on a mobile device, according to one or more embodiments.
Figure 5B:
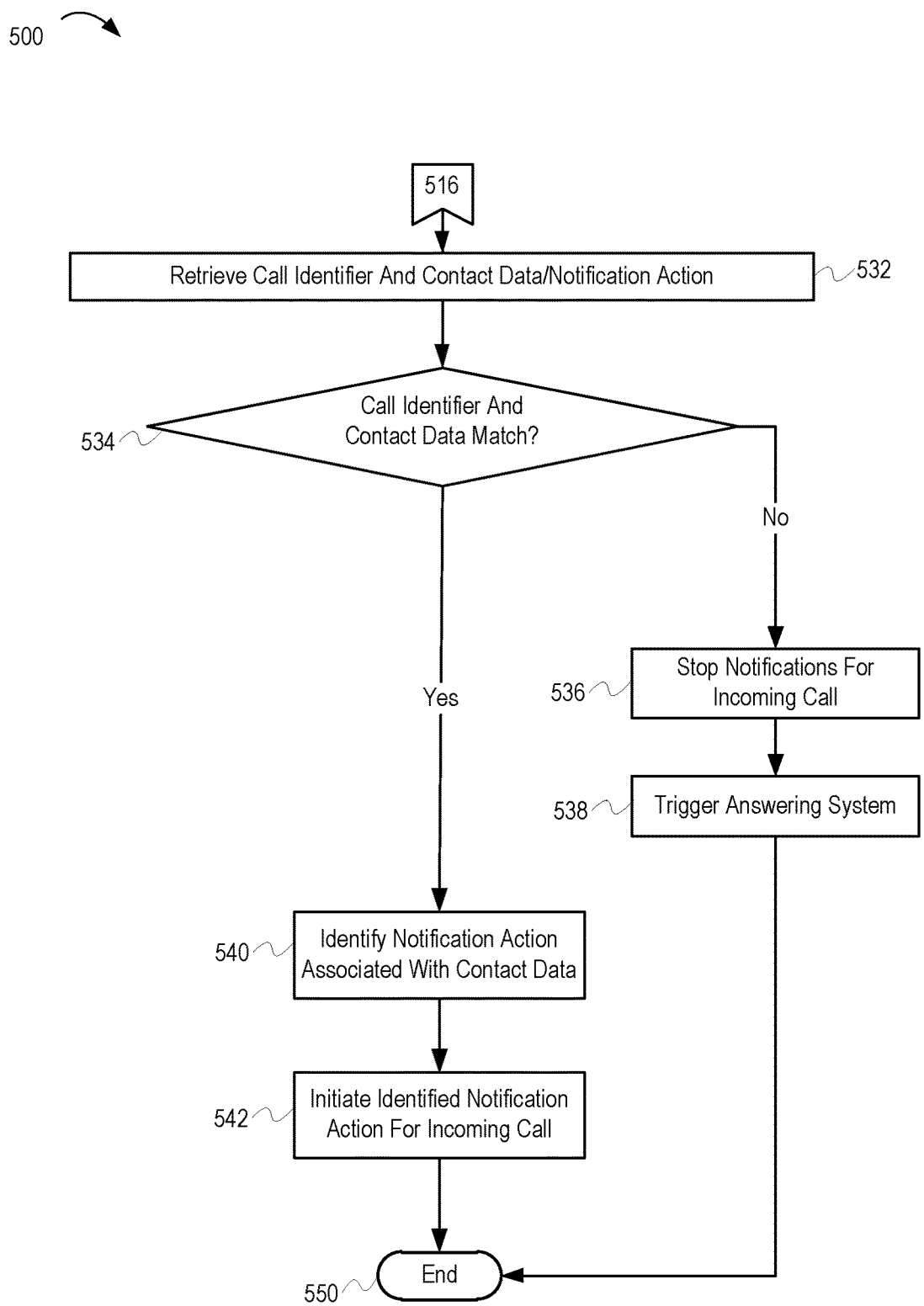

FIGS. 5A and 5B depict a method 500 for managing incoming calls on a mobile device. The description of method 500 will be described with reference to the components and examples of FIGS. 1-4D. The operations depicted in FIGS. 5A and 5B can be performed by mobile device 100 or any suitable communication device that includes the one or more functional components of mobile device 100 that provide/enable the described features. One or more of the processes of the methods described in FIGS. 5A and 5B may be performed by a processor or controller (e.g., processor 102 or image capture device controller 134) executing program code associated with call management module 136 and facial recognition module 137. The processes of the methods described in FIGS. 5A and 5B will specifically be described as being performed by processor 102 executing program code associated with call management module 136 and facial recognition module 137.

With specific reference to FIG. 5A, method 500 begins at the start block 502. At block 504, processor 102 detects an incoming call 154. The incoming call can be received via at least one of radios 142*a-n* or via an internet connection. In one embodiment, mobile device 100 can receive internet or Wi-Fi based calls via short range communication device 164. Processor 102 retrieves reference face shape data 230 (block 506) and triggers image capture device 132 to capture a preview image of the field of view 410 and transmit image data A 212 to processor 102 (block 508). Processor 102 receives image data A 212 and compares image data A 212 to reference face shape data 230 (block 510).

At decision block 512, processor 102 determines if the image data A 212 is substantially similar to reference face shape data 230. In other words, processor 102 identifies if a face is within field of view 410 of image capture device 132. In response to the image data A 212 not being substantially similar to reference face shape data 230, processor 102 determines if a network disconnect 290 has been received from network 150 (decision block 522). Network 150 can transmit a network disconnect 290 to mobile device 100 after a pre-determined period of time if no user action occurs such as a user selecting to accept the call or to reject the call via touch screen interface 131. In response to determining that network disconnect 290 has been received, method 500 ends at end block 530.

In response to determining that a network disconnect has not been received, processor 102 determines if a user input has been received (i.e., selection of accept call icon 360 or reject call icon 362 by a user) (decision block 524). In response to determining that a user input has been received, processor 102 triggers the user input action to occur (block 526). Method 500 then ends at end block 530. In response to determining that a user input has not been received, processor 102 continues to trigger image capture device 132 to capture preview images and transmit additional image data (e.g., image data B 214) to processor 102 (block 508).

In response to image data A 212 being substantially similar to reference face shape 230 (decision block 512), processor 102 retrieves reference user image data 232 from system memory 120 (block 514). Processor 102 determines if image data A 212 is substantially similar to reference user image data 232 (decision block 516). In other words, processor 102 identifies if image data A 212 contains the face of a registered user of mobile device 100. In response to image data A 212 being substantially similar to the reference user image data 232, processor 102 stops at least one notification 250 associated with the incoming call (block 518). Stopping notifications 250 can include stopping one or more of ring tones 252, vibration mode 254 and display messages 256. After a registered user has viewed mobile device 100, the notification can be stopped automatically by mobile device 100 so that the user does not have to manually stop the notification. Stopping the notification automatically is useful in that the user does not have to manually stop the notification or continue to be interrupted by the audible or tactile (vibrations) notification. The mobile device determines that the registered user has decided not to answer the incoming call once the mobile device detects the face of the registered user viewing the call screen or display, but the registered user does not answer the call within a predetermined period of time (e.g., 1 ring, or 2 seconds) after the registered user is detected looking at the call screen or display. Processor 102 then determines if network disconnect 290 has been received from network 150 as previously described with decision block 522.

Turning now to FIG. 5B, in response to the image data A 212 not being substantially similar to the reference user image data 232 (decision block 516), processor 102 retrieves call identifier 270 from incoming call data and retrieves contact data 272 from system memory 120 (block 532). Processor 102 determines if call identifier 270 and at least one of contact data 272 match (decision block 534). In response to call identifier 270 and at least one of contact data 272 not matching, processor 102 stops at least one notification 250 associated with the incoming call (block 536). Stopping the notification automatically is useful in that the user does not have to manually stop the notification. Incoming calls from unknown callers are typically associated with unwanted calls such as spam calls or automated callers. By identifying that the call identifier of the incoming call is not in the database of contact data, mobile device 100 can automatically discontinue notifications for incoming calls that typically are unwanted by the user. Processor 102 triggers answering system module 260 to answer the incoming call (block 538). Method 500 then terminates at end block 550.

In response to call identifier 270 and at least one of contact data 272 matching, processor 102 identifies at least one notification action 276 associated with the matching contact A 274 (block 540). Processor 102 initiates the identified notification action 276 for the incoming call (block 542). Method 500 then ends at end block 550. In one embodiment, notification actions can be used/configured to provide different or customized ring tones for different contacts. In another embodiment, notification actions can be to provide vibration alerts for some contacts and omit vibration alerts for other contacts. For example, according to one or more embodiments, the first ring tone may be used for incoming calls from family members, and the second ring tone may be used to alert the user to calls from work contacts. According to another aspect, a vibration alert may be used for incoming calls from family members, and omitted for calls from work contacts.

In an alternative embodiment, mobile device 100 can perform the method processes of blocks 532, 534, 540 and 542 after detection of the incoming call (block 504) (FIG. 5A). After the call is initially detected at block 504, processor 102 can retrieve contact data 272 from system memory 120 and determine if call identifier 270 and at least one of contact data 272 match. If call identifier 270 and at least one contact of contact data 272 match, processor 102 can identify a different or customized ring tone (i.e., notification action 276 for the identified contact and provide the initial notification to a user as the customized notification. Processor 102 can then perform the remaining method processes of FIG. 5A (blocks 506-530).

In the above-described methods of FIGS. 5A-B, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure.

Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. A method comprising:
    detecting, via a processor of a communication device, an incoming call;
    triggering an image capture device to capture first image data from a field of view of the image capture device;
    receiving the first image data from the image capture device;
    retrieving reference user image data from a memory;
    determining if the first image data is substantially similar to the reference user image data; and
    in response to the first image data being substantially similar to the reference user image data, stopping at least one notification associated with the incoming call.

2. The method of claim 1, wherein:
    retrieving reference user image data from the memory comprises retrieving reference face shape data from the memory; and
    determining if the first image data is substantially similar to the reference user image data comprises determining if the first image data is substantially similar to the reference face shape data.

3. The method of claim 2, further comprising:
    in response to the first image data not being substantially similar to the reference face shape data, determining if a network disconnect has been received;
    in response to a network disconnect not being received, determining if a user input has been received;
    in response to a user input not being received, triggering the image capture device to capture second image data from the field of view of the image capture device;

determining if the second image data is substantially similar to the reference user image data; and in response to the second image data being substantially similar to the reference user image data, stopping at least one notification associated with the incoming call.

4. The method of claim 1, further comprising:

in response to the first image data not being substantially similar to the reference user image data, retrieving contact data from the memory;

determining if a call identifier matches at least one contact of the contact data; and in response to the call identifier not matching at least one contact of the contact data, stopping at least one notification associated with the incoming call.

5. The method of claim 1, further comprising:

in response to the first image data not being substantially similar to the reference user image data, retrieving contact data from the memory;

determining if a call identifier matches at least one contact of the contact data;

in response to the call identifier matching at least one contact of the contact data, identifying at least one notification action associated with the at least one contact; and initiating the identified at least one notification action.

6. The method of claim 1, wherein stopping the at least one notification associated with the incoming call comprises at least one of:

stopping at least one audible call ring; and de-activating a vibration device.

7. The method of claim 1, wherein after detecting the incoming call, the method further comprises:

retrieving contact data from the memory;

determining if a call identifier matches at least one contact of the contact data;

in response to the call identifier matching at least one contact of the contact data, identifying at least one notification action associated with the at least one contact; and initiating the identified at least one notification action.

8. A communication device comprising:

an image capture device;

a vibration device;

a memory having stored thereon a facial recognition module and a call management module for managing calls on the communication device; and one or more processors communicatively coupled to the image capture device, the vibration device and the memory, the one or more processors executing program code of the facial recognition module and the call management module, which enables the communication device to:

detect an incoming call;

trigger the image capture device to capture first image data from a field of view of the image capture device;

receive the first image data from the image capture device;

retrieve reference user image data from the memory;

determine if the first image data is substantially similar to the reference user image data; and in response to the first image data being substantially similar to the reference user image data, stop at least one notification associated with the incoming call.

9. The communication device of claim 8, wherein:

to retrieve reference user image data from the memory, the one or more processors are further enabled to retrieve reference face shape data from the memory; and to determine if the first image data is substantially similar to the reference user image data, the one or more processors are further enabled to determine if the first image data is substantially similar to the reference face shape data.

10. The communication device of claim 9, wherein the one or more processors are further enabled to:

in response to the first image data not being substantially similar to the reference face shape data, determine if a network disconnect has been received;

in response to a network disconnect not being received, determine if a user input has been received;

in response to a user input not being received, trigger the image capture device to capture second image data from the field of view of the image capture device;

determine if the second image data is substantially similar to the reference user image data; and in response to the second image data being substantially similar to the reference user image data, stop at least one notification associated with the incoming call.

11. The communication device of claim 8, wherein the one or more processors are further enabled to:

in response to the first image data not being substantially similar to the reference user image data, retrieve contact data from the memory;

determine if a call identifier matches at least one contact of the contact data; and in response to the call identifier not matching at least one contact of the contact data, stop at least one notification associated with the incoming call.

12. The communication device of claim 8, wherein the one or more processors are further enabled to:

in response to the first image data not being substantially similar to the reference user image data, retrieve contact data from the memory;

determine if a call identifier matches at least one contact of the contact data;

in response to the call identifier matching at least one contact of the contact data, identify at least one notification action associated with the at least one contact; and initiate the identified at least one notification action.

13. The communication device of claim 8, wherein stopping the at least one notification associated with the incoming call comprises at least one of:

stopping at least one audible call ring; and de-activating the vibration device.

14. The communication device of claim 8, wherein after detecting the incoming call, the one or more processors are further enabled to:

retrieve contact data from the memory;

determine if a call identifier matches at least one contact of the contact data;

in response to the call identifier matching at least one contact of the contact data, identify at least one notification action associated with the at least one contact; and initiate the identified at least one notification action.

15. A computer program product comprising:

a computer readable storage device having stored thereon program code for managing calls received by a communication device with one or more processors, an image capture device, and a memory, the program code, when executed by the one or more processors of the communication device, enables the communication device to complete the functionality of:

detecting an incoming call;

triggering the image capture device to capture first image data from a field of view of the image capture device;

receiving the first image data from the image capture device;

retrieving reference user image data from the memory;

determining if the first image data is substantially similar to the reference user image data; and in response to the first image data being substantially similar to the reference user image data, stopping at least one notification associated with the incoming call.

16. The computer program product of claim 15, wherein the program code for managing calls comprises program code that further enables the communication device to complete the functionality of:

retrieving reference user image data from the memory comprises retrieving reference face shape data from the memory; and determining if the first image data is substantially similar to the reference user image data comprises determining if the first image data is substantially similar to the reference face shape data.

17. The computer program product of claim 16, wherein the program code for managing calls comprises program code that further enables the communication device to complete the functionality of:

in response to the first image data not being substantially similar to the reference face shape data, determining if a network disconnect has been received;

in response to a network disconnect not being received, determining if a user input has been received;

in response to a user input not being received, triggering the image capture device to capture second image data from the field of view of the image capture device;

determining if the second image data is substantially similar to the reference user image data; and in response to the second image data being substantially similar to the reference user image data, stopping at least one notification associated with the incoming call.

18. The computer program product of claim 15, wherein the program code for managing calls comprises program code that further enables the communication device to complete the functionality of:

in response to the first image data not being substantially similar to the reference user image data, retrieving contact data from the memory;

determining if a call identifier matches at least one contact of the contact data; and in response to the call identifier not matching at least one contact of the contact data, stopping at least one notification associated with the incoming call.

19. The computer program product of claim 15, wherein the program code for managing calls comprises program code that further enables the communication device to complete the functionality of:

in response to the first image data not being substantially similar to the reference user image data, retrieving contact data from the memory;

determining if a call identifier matches at least one contact of the contact data;

in response to the call identifier matching at least one contact of the contact data, identifying at least one notification action associated with the at least one contact; and initiating the identified at least one notification action.

20. The computer program product of claim 15, wherein stopping the at least one notification associated with the incoming call further comprises program code for managing calls that further enables the communication device to complete the functionality of at least one of:

stopping at least one audible call ring; and de-activating a vibration device.

* * * * *